(12) United States Patent
Horn et al.

(10) Patent No.: US 7,561,929 B2
(45) Date of Patent: Jul. 14, 2009

(54) INDUSTRIAL CONTROLLER BASED ON DISTRIBUTED TECHNOLOGY OBJECTS

(75) Inventors: Wolfgang Horn, Hohenstein-Ernstthal (DE); Johannes Birzer, Stulln (DE); Tino Heber, Freiberg (DE); Raimund Kram, Erlangen (DE); Martin Kiesel, Poxdorf (DE)

(73) Assignee: Siemens Aktienegesellschaft, Munich (DE)

( * ) Notice: Subject to any disclaimer, the term of this patent is extended or adjusted under 35 U.S.C. 154(b) by 849 days.

(21) Appl. No.: 11/093,155

(22) Filed: Mar. 28, 2005

(65) Prior Publication Data

US 2005/0171622 A1 Aug. 4, 2005

Related U.S. Application Data

(63) Continuation of application No. 09/895,904, filed on Jun. 29, 2001, now Pat. No. 6,882,890.

(30) Foreign Application Priority Data

| Aug. 3, 2000 | (DE) | ................. 100 37 971 |
| Aug. 3, 2000 | (DE) | ................. 100 37 990 |
| Nov. 8, 2000 | (DE) | ................. 100 55 168 |
| Nov. 8, 2000 | (DE) | ................. 100 55 169 |

(51) Int. Cl.
| G05B 19/42 | (2006.01) |
| G05B 11/01 | (2006.01) |
| G05B 19/18 | (2006.01) |
| G06F 9/44 | (2006.01) |
| G06F 9/445 | (2006.01) |

(52) U.S. Cl. ............................ 700/86; 700/18; 700/61; 717/108; 717/121; 717/174

(58) Field of Classification Search ............... 700/18, 700/61, 86, 87, 97, 257; 709/201, 208, 209; 715/763; 717/107–110, 121, 127, 158, 174; 719/315, 328; 345/660, 666; 901/3–5
See application file for complete search history.

(56) References Cited

U.S. PATENT DOCUMENTS

| 5,452,201 A | 9/1995 | Pieronek et al. |
| 5,453,933 A | 9/1995 | Wright et al. |

(Continued)

FOREIGN PATENT DOCUMENTS

DE 197 40 550 A1 4/1998

(Continued)

OTHER PUBLICATIONS

Search Report for EP 01 11 7885, dated Jul. 15, 2004.
U.S. Appl. No. 10/181,204, filed Jul. 10, 2002, Wucherer et al.
U.S. Appl. No. 10/181,205, filed Jul. 10, 2002, Wucherer et al.
Search Report issued in related German Application No. DE 100 55 169.6 and its translation, Nov. 30, 2005.

(Continued)

*Primary Examiner*—Crystal J Barnes Bullock
(74) *Attorney, Agent, or Firm*—Scott T. Weingaertner; King & Spalding LLP (57) ABSTRACT

A method and system for controlling an industrial controller based on technology objects are disclosed. Technology object types may be loaded and instantiated into the run time system of a controller, thereby increasing the functionality and providing technological scaling of the controller. Technology object types may be loaded in the form of technology packages and a user may use the functionality of the invention directly in a user program.

21 Claims, 10 Drawing Sheets

U.S. PATENT DOCUMENTS

| | | | |
|---|---|---|---|
| 5,485,400 A | 1/1996 | Warrior et al. | |
| 5,485,620 A | 1/1996 | Sadre et al. | |
| 5,485,626 A | 1/1996 | Lawlor et al. | |
| 5,576,946 A | 11/1996 | Bender et al. | |
| 5,611,059 A | 3/1997 | Benton et al. | |
| 5,805,442 A | 9/1998 | Crater et al. | |
| 5,841,654 A | 11/1998 | Verissimo et al. | |
| 5,844,804 A | 12/1998 | Schussler | |
| 5,857,197 A | 1/1999 | Mullins | |
| 5,911,069 A * | 6/1999 | Beard | 719/315 |
| 5,943,497 A * | 8/1999 | Bohrer et al. | 717/121 |
| 6,032,208 A * | 2/2000 | Nixon et al. | 710/64 |
| 6,063,128 A * | 5/2000 | Bentley et al. | 703/6 |
| 6,126,330 A * | 10/2000 | Knight | 717/127 |
| 6,144,993 A | 11/2000 | Fukunaga et al. | |
| 6,158,049 A * | 12/2000 | Goodwin et al. | 717/158 |
| 6,263,487 B1 | 7/2001 | Stripf et al. | |
| 6,282,455 B1 | 8/2001 | Engdahl | |
| 6,327,628 B1 | 12/2001 | Anuff et al. | |
| 6,332,218 B1 | 12/2001 | Walker et al. | |
| 6,397,252 B1 | 5/2002 | Sadiq | |
| 6,424,872 B1 | 7/2002 | Glanzer et al. | |
| 6,437,805 B1 * | 8/2002 | Sojoodi et al. | 715/763 |
| 6,501,995 B1 | 12/2002 | Kinney et al. | |
| 6,539,268 B1 * | 3/2003 | Wucherer et al. | 700/61 |
| 6,571,273 B1 | 5/2003 | Shirai et al. | |
| 6,594,541 B1 | 7/2003 | Wucherer et al. | |
| 6,600,964 B2 * | 7/2003 | Hess et al. | 700/97 |
| 6,604,196 B1 * | 8/2003 | Monday et al. | 713/100 |
| 6,615,088 B1 | 9/2003 | Myer et al. | |
| 6,684,261 B1 * | 1/2004 | Orton et al. | 719/328 |
| 6,684,385 B1 * | 1/2004 | Bailey et al. | 717/109 |
| 6,889,097 B2 * | 5/2005 | Kiesel et al. | 700/18 |
| 6,912,442 B2 | 6/2005 | Wucherer et al. | |
| 6,950,715 B2 | 9/2005 | Wucherer | |
| 6,990,652 B1 * | 1/2006 | Parthasarathy et al. | 717/107 |
| 7,168,062 B1 * | 1/2007 | Schmitter | 717/110 |
| 7,424,704 B2 * | 9/2008 | Orton et al. | 717/136 |
| 7,474,929 B2 * | 1/2009 | Nixon et al. | 700/83 |
| 2003/0033037 A1 | 2/2003 | Yuen et al. | |
| 2003/0045950 A1 | 3/2003 | Bronikowski et al. | |

FOREIGN PATENT DOCUMENTS

| | | |
|---|---|---|
| DE | 198 53 205 A1 | 6/2000 |
| EP | 0 852 759 B1 | 3/2002 |
| WO | WO 97/12301 | 4/1997 |

OTHER PUBLICATIONS

Search Report issued in related German Application No. DE 100 55 168.8 and its translation, Nov. 29, 2005.

Seki, T. et al.: "Decentralized Autonomous Object-oriented EMS/SCADA System"; 3rd ISADS, Apr. 9-11, 1997, pp. 395-402.

Jasper, W. J. et al.: "Real-time System for Data Acquisition and Control of Batch Dyeing"; IEEE Annual textile, pp. 1-5, (1994).

Lafont, J. C. et al.: "Modelling and a Design of a Production Automated System Using a Decisional Object Oriented Method 'MACSOOD'"; Proceedings CompEuro 1993, May 24-27, pp. 282-287, (1993).

Hasan, K., et al.: "An Object-oriented Expert System for Power System Alarm Processing and Fault Identification"; 7th Mediterranean Electrotechnical Conference, Apr. 12-14, pp. 909-912 (1994).

Brooke, D. W. I.: "Software Tools for Small Scale Process Controllers Using a Real-time Rule Interpreter and Object-oriented Technique"; ICC, bd. 1, Mar. 25-28, pp. 306-310, (1991).

Smith, L. S. et al.: "Object-oriented Modelling and Control"; IEE Colloquium, Mar. 5, pp. 2/1-2/3, (1991).

McMillan, G. K., et al.: "Process/Industrial Instruments and Controls Handbook: Object-Oriented Software Components and Containers," pp. 3.24-3.25, (1999).

McMillan, G. K., et al.: "Process/Industrial Instruments and Controls Handbook: Controllers," pp. 3.43-3.45, (1999).

McMillan, G. K., et al.: "Process/Industrial Instruments and Controls Handbook: Function Blocks Defined by Foundation Fieldbus Specification," p. 11.23, (1999).

Coote, S. et al.: "Graphical and Iconic Programming Languages for Distributed Process Control: An Object Oriented Approach"; IEEE Workshop, Oct. 10-12, 1998, pp. 183-190.

* cited by examiner

INDUSTRIAL CONTROLLER BASED ON DISTRIBUTED TECHNOLOGY OBJECTS

This application is a continuation of U.S. patent application Ser. No. 09/895,904, filed Jun. 29, 2001, now U.S. Pat. No. 6,882,890, the contents of which are hereby incorporated by reference in their entirety.

FIELD OF THE INVENTION

This invention relates to an industrial controller for technical processes, in particular for production machines.

Specifically, this invention also relates to a method of creating an industrial controller, in particular for a certain area of application, e.g., for use in packaging machines.

BACKGROUND

An industrial controller may be a separate device or it may be integrated into a computer, a PC, a stand-alone unit or a drive.

Prior industrial controllers known previously for automation of technical processes have been based essentially either on a "programmable controller functionality", a "motion control (MC) functionality" or a technological functionality. Since a certain scope of function is specified with respect to such functionalities, optimal adaptation to the requirements of a specific process is limited; an entire group of functions is often superfluous in a specific application (e.g., any functionality for packaging machines might be superfluous when using an MC controller for machine tools).

German Patent 197 40 550 describes a device that executes a control program for controlling a technical process and/or controlling the motion of a processing machine. This control program comprises a plurality of software modules. Process control functionalities of known programmable controllers and motion functionalities of known MC controllers are implemented in a uniform configurable control system. However, individual software modules here are executed by a partial subgroup control, so that a central processing unit is to be provided for each software module.

In addition, German Patent 198 53 205 describes a method of controlling technical processes, where the method is based on instantiability and on-demand interleaving of software components with a preselectable, at least parameterizable, functionality. The interleaving and design of the software components are not optimized, however.

Therefore, an object of this invention is to create optimal features of an industrial controller with regard to its control structure, as well as its functionality, for different control tasks and different boundary conditions and requirements of the basic technical processes in a simple manner.

The inventors have based this finding on the discovery that the run time system and/or engineering system of the industrial controller operates both a programmable controller functionality and a motion functionality and/or a technological functionality. The possibility of dynamic loading of function code into the run time system and/or engineering system of the industrial controller permits an optimal sizing of the controller, i.e., scaling, must be possible.

SUMMARY OF THE INVENTION

An object of the present invention, defined above, is achieved for an industrial controller in that:

a) the controller has a generally usable basic system, preferably technology-neutral, for the basic functionality of the controller,
b) the technological functionality of the controller is made available via technology object types,
c) there is technological scaling with regard to the functionality of the controller through additionally loadable technology object types, and
d) the object types are instantiated and selected by the user specifically for the corresponding application.

A technology object preferably represents a component of the real world. In the context of industrial controllers, these may be, for example, components of machine tools or production machines. Technology objects provide a defined, closed technological functionality. They may be interleaved with one another to implement complicated technological tasks. Because the technological functionality of the controller is formed by technology objects, which are preferably real components, the technology capability (i.e., the capability of the controller) is immediately transparent to a user of the controller. A technology object may also very easily be reused by a user as a technological software unit in different applications and controllers. A user can abstract objects from their implementation when using technology objects. Technology objects that can be used directly by the user in his user programs are obtained by instantiation from technology object types. Any desired number of instances of technology objects can be obtained from a technology object type once it has been defined. Because instantiation can take place in the engineering system or in the run time system, it is convenient and easy for the user to use the technology objects in his applications. The functional capability of a controller can thus be expanded very easily. This expandability is limited only by hardware restrictions (e.g., CPU, power or memory restrictions).

In addition, the user has the option of expanding the existing basic system for the basic functionality of the controller by adding only those functionalities actually needed by the user for his applications. This is because the user explicitly loads certain required technology objects into the basic system of the controller. A user can thus acquire individually a controller with a certain functionality. Unneeded functionalities usually present in controllers are, thus, avoided, and do not cause any overhead.

Another advantage consists of the development and production of such scalable controllers. Controllers which are supplied with a necessary basic functionality (a basic system) can be produced in large numbers very easily (yielding of scale).

In a first advantageous embodiment of the invention, loading and distribution of the technology objects takes place on run time systems and/or hardware systems with the same or different performance. Technology objects are independent of platform and hardware. They do not include any platform-specific or hardware-specific properties and, thus, they can be loaded and distributed very easily on different hardware systems and/or run time systems. The possibility for loadability and distributability of the technology objects on hardware systems of the same or different performance level permits a user to use technology objects very flexibly and not be concerned with restrictions on the basic performance of the hardware systems and/or run time systems in the loadability and distributability of the technology objects.

In another advantageous embodiment of the invention, technology objects are loaded and distributed on hardware and/or run time systems of the same or different performance level within a project, with a project being based on data and/or programs from one or more control units. A user therefore has the option of using devices having different hardware within a project. These devices may also have differing performance levels, and the technology objects can be distributed easily and flexibly to these hardware devices without having to take into account performance differences between the devices.

In another embodiment of the invention, functionality of the technology objects is distributed among control units by synchronized, equidistant communication with one another in real time. The technology objects can therefore be distributed to devices and control units, which are connected by a communications medium that allows a synchronized, equidistant communication. The technology objects can thus communicate with one another in real time. Thus, in one project the instances of technology object types can be referenced unambiguously and can be used independently of the (hardware) platform.

In another embodiment of the claimed invention, functionality of the controller can be expanded through additional loadability of technology object types. The user thus can achieve a functional scaling of his controller. Therefore, a user can very easily adapt the functionality of a controller to the given basic needs and boundary conditions. Expandability is based on both device functionality and technological functionality.

In another embodiment of the invention, technology objects may contain program interfaces and/or system variables and/or alarms. With these program interfaces, the technology objects can be called up in a user program and used. Through the system variables, status information on technology objects is made available to the user program through the system variables: these system variables contain parameterizable settings for programming which can be altered in the user program. The values of system variables can be read out consistently through structures. System variables may be updated by the user program if they reflect the status. Technological alarms are defined and generated on the technology object. Their response to the program execution (global reaction) can be adjustable in an instance-specific response for each error in the engineering system at the time of start-up. The alarms together with the technical objects instance have an unambiguous identifier.

In another embodiment of the claimed invention, technology objects may be integrated into a programming environment. It is thus very easy and convenient for a user to use the technology objects in his user programs.

In another embodiment of the invention, a standard programming environment may be used. Standard programming environments include, for example, IEC 1131, C++ or Java. By tying the technology objects into IEC 1131, the user has the option of using technology objects directly in a programming environment that has been standardized for industrial requirements. The integration of the technology objects into C++ or Java gives a user the option of using the technology objects directly in an object-oriented programming environment. The integration of the technology objects into these programming environments expands the scope of the language and the function of these programming environments with regard to their technological functionality, as needed by the industrial controllers.

In another embodiment of the claimed invention, feedback-free programming of a technology object is provided with respect to other technology objects present and with respect to the basic system of the controller, unless feedback is explicitly programmed or designed. A user can thus program the behavior of a technology object independently of feedback from other technology objects or the basic system of the controller. If necessary or desired, however, a user may explicitly program or design a feedback procedure. The flexibility of the user in programming technology objects is thus increased.

In another embodiment of the present invention technology objects may be used in a manner that is neutral with regard to hardware and platform. The user can therefore abstract objects completely from the underlying hardware or platform in using the technology objects, and can concentrate completely on the technological functionality of technology objects when using them in his user programs.

In another embodiment of the present invention, technology objects may have hierarchical relationships and/or data flow relationships with other technology objects with regard to their functionality. Thus, structures and relationships of real environments can be imaged directly on technology objects. For example, the technology object ""synchronous axis" may contain the functionality of the technology object ""positioning axis," which in turn contains the functionality of the technology object ""rpm axis."

In another embodiment of the present invention, elements such as axes, sensors, cams, probes, synchronism and cam plates may be present as technology objects, especially for motion controllers. These technology objects represent typical elements in the context of motion controllers. A user can use their representation as technology objects directly in applications.

In another embodiment of the present invention, technology object types can be combined into technology packages. By clustering and allocation of technology object types to technology packages, structuring and classification are achieved. Technology packages are a suitable means for loading technology object types into the run time system of a controller.

In another advantageous embodiment of the present invention, a program may be created before allocating the hardware platform. Technology objects can thus be used in programs independently of the target hardware. This facilitates and increases the reuse of software.

In another embodiment of the present invention the number of instantiations of technology object types can readily be adjusted. A user is only restricted in to the number of instances his user program by hardware limitations (e.g., CPU power or memory capacity).

In another embodiment of the present invention, instances of technology object types can be distributed for storage on one or more control units. This feature allows a flexible distribution and balancing of the load in a system.

In another embodiment of the present invention, commands of technology objects may be used in a synchronous and/or asynchronous manner. This feature supports a cyclic programming option favoring a programmable control system and a sequence-oriented programming option (as is customary with motion controllers). The user can indicate whether a command is to be executed synchronously or asynchronously.

According to this invention, the object defined above is achieved for an industrial control process through the following sequential steps:
a) providing a basic system having a basic functionality, preferably neutral as to technology,
b) selecting and instantiating technology object types relevant for the application and configuring the resulting technology objects in the engineering system,
c) loading the selected technology object types into the run time system, d) loading and utilizing the instantiated technology objects and the instantiation information in the run time system, e) creating user programs by utilizing the instantiated technology objects, and f) loading the user programs into the run time system.

Therefore, the user has an opportunity to achieve the functionality of a desired controller in a systematic and consistent manner, ensuring that the resulting controller does not involve any functional overhead.

The essential advantages achieved with this invention consist in particular of the fact that a user can directly use in his applications a technological functionality that is made available to him through technology objects. These technology objects correspond to elements of the real world, in a manner that is adequate for the user's requirements.

Another advantage of the claimed invention is that the functionality of industrial controllers can be expanded in a dedicated manner by the so-called "plug-and-play" system. Technological scaling of the controller can be achieved in this way.

BREIF DESCRIPTION OF THE FIGURES

An example of this invention is illustrated in the drawings and explained in greater detail below.

DETAILED DESCRIPTION OF THE INVENTION

Figure 1:
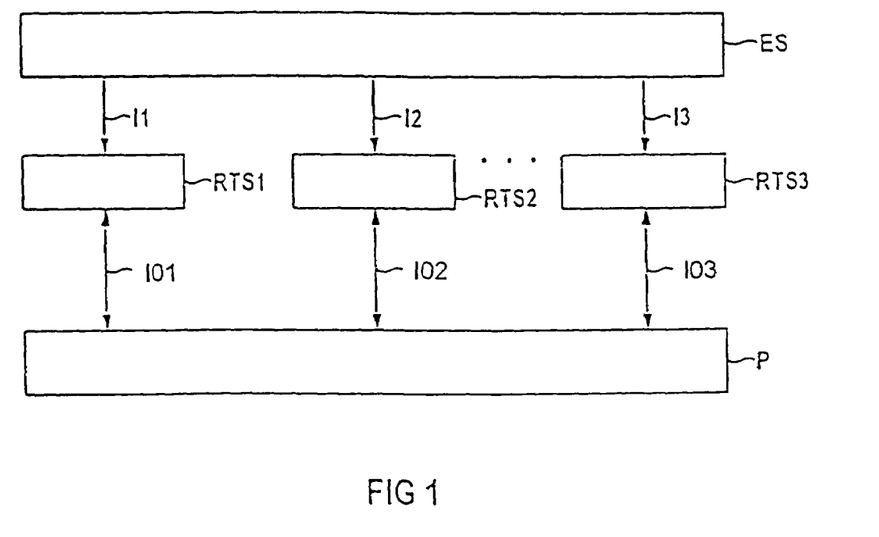
FIG. 1 shows a block diagram illustrating an engineering system, the respective run time system and the technical process to be controlled.

In the form of a block diagram, FIG. 1 shows that a technical process P may be controlled over at least one run time system RTS1-RTS3 of an industrial controller. The connection between the run time systems RTS1-RTS3 of the controller and the technical process P is bidirectional over inputs/outputs IO1-IO3. The controller is programmed and the definition of the performance of run time systems RTS1-RTS3 defined, using engineering system ES. Engineering system ES contains tools for configuring, designing and programming for machines and the controllers of technical processes. Programs generated in engineering system ES are transmitted over information paths I1-I3 to run time systems RTS1-RTS3 of the controllers. The three dots between RTS2 and RTS3 indicate that additional controllers and run time systems may be present. With regard to its hardware, an engineering system ES may comprise a computer system with a graphic display screen (e.g., a display), input means (e.g., keyboard and mouse), a processor, a working memory and a secondary memory, a device for reading and recording computer-readable media (e.g., diskettes, CDs) and terminal units for data exchange with other systems (e.g., other computer systems, other controllers for technical processes) or media (e.g., Internet). A controller usually comprises input or output units, a processor and a program memory.

Figure 2:
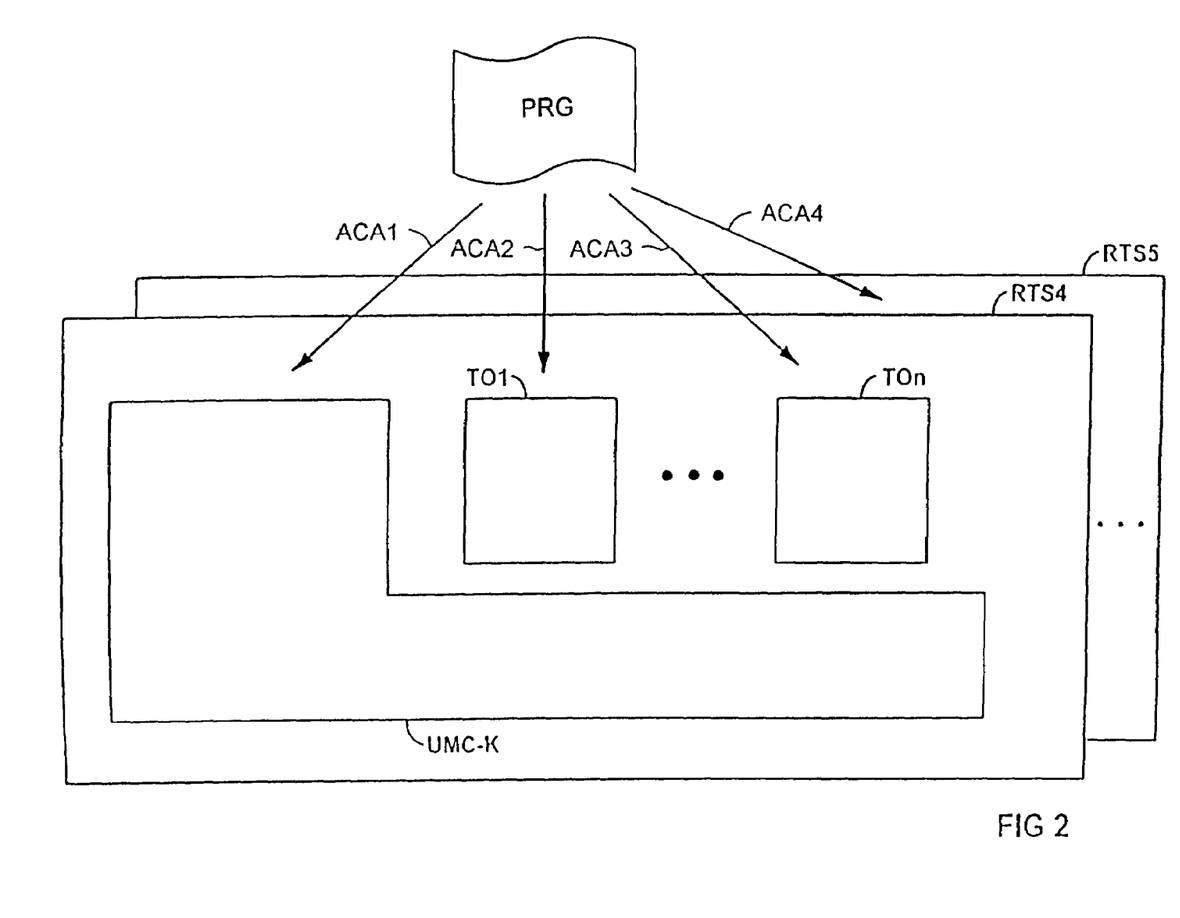
FIG. 2 shows in a survey diagram how a user program accesses a technological functionality in the run time system.

FIG. 2 shows two run time systems RTS4 and RTS5 of industrial controllers, illustrated as rectangles. Run time systems RTS4 and RTS5 each contain a universal motion control (UMC) kernel UMC-K and technology objects TO1 through TOn. The respective UMC kernels as well as the technology objects may be different; technology objects may also differ in number. UMC kernel UMC-K is the basic system of the controller; this system contains the basic functionality of the controller. UMC kernel UMC-K is shown in a rectangular stair-step form. Technology objects TO1 through TOn can be loaded into said UMC kernel. Through this additional installation, the scope of function of the basic system may be expanded. Technology objects TO1 through TOn are illustrated as rectangles. Their arrangement in FIG. 2 indicates that they expand the UMC kernel UMC-K. The three dots between TO1 and TOn indicate that one or more technology objects TO1 through TOn may be loaded into this kernel. This arrangement results in technological scaling of the entire controller. At the top center of FIG. 2, user program PRG is shown in the of a schematic paper flag. Access arrows ACA1 through ACA4 indicate that a user can access functionalities of the UMC kernel UMC-K directly in his user program AP and can also access functionalities of technology objects TO1 through TOn, from RTS4 or RTS5, or from another run time system (also indicated by three dots). A user can use these functionalities of run time systems RTS4 and RTS5 (or of some other run time systems) directly in an application program PRG.

More precisely, to expand the basic system of a run time system, technology objects are usually loaded in the form of technology object types. Such technology object types include, for example, axes, cams, cam plates and the like. Technology object types are instantiable. A user can use instances of technology object types for concrete applications in his application programs PRG. Such instances are then defined unambiguously and are identifiable throughout the project. Direct use of technology objects loaded additionally in user program PRG as independent program objects would also be possible in principle, but such direct use would not be flexible for a user generating a program.

Figure 3:
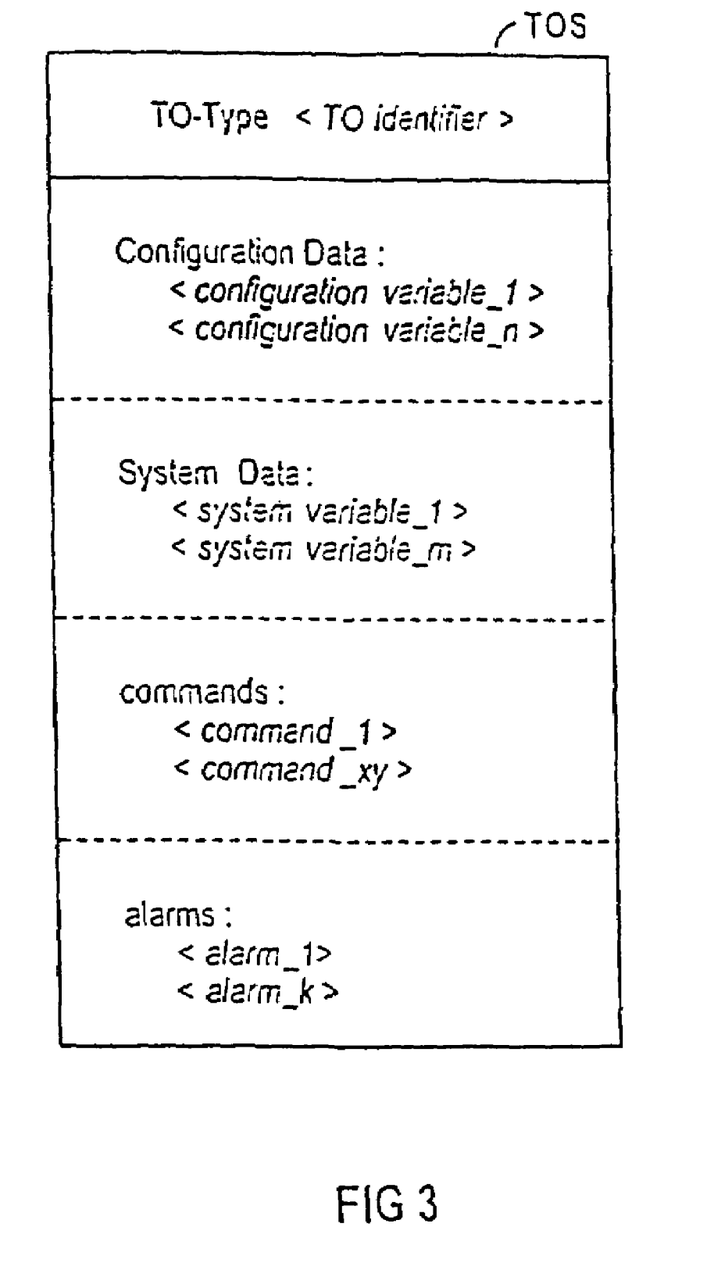
FIG. 3 shows in an abstract schematic diagram a technology object having a user interface.

FIG. 3 shows in an abstract schematic diagram a user's view of a technology object, i.e., an instance of a technology object type, This specification of a technology object TOS is shown as a rectangle composed of five parts. The first part at the top, which is separated from the following parts by a solid line, contains the type of the underlying technology object (TO type) and the TO identifier, i.e., the unique designation of the instantiation within the project. The next part which follows contains the configuration data with the configuration variables <configuration variable__1> through <configuration variable_n>.

Through the configuration data, the technology object is set in its basic mode of operation. The configuration data is set through the engineering system (ES, FIG. 1) and may optionally be read or written from the user program (PRG, FIG. 2) through access functions.

In FIG. 3, configuration data is separated from system variables (system data) by a dotted line. The system variables <system variable_1> through <system variable_m> can be altered from the user program (PRG, FIG. 2) and can be used as program variables. System variables may be readable or read-/writable. In addition, the states of technology objects are represented by system variables. Transitions of state can be triggered by events and/or commands. Technology objects are parameterized through configuration data and system variables.

In the next section of FIG. 3, the commands are also separated from the system variables by a dotted line. Commands <command_1> through <command_xy> represent functions that can be called up and represent the functionality of a technology object. These functions have defined identifiers, function parameters and local values. These functions may have parameters. When functions are called up, optional parameters may be omitted and default values used instead. In addition to the technological functionality, however, a technology object also has commands that determine the basic behavior of the technology object, e.g., commands to reset in a defined starting state;
commands to reset a pending error specifically;
commands to set and reset in simulation mode (in simulation mode, the program is run through without concrete output to actuators or input from the sensors);
commands to make the technology object active/inactive; and
information functions.

The alarms are the next section of the specification of a technology object TOS. In FIG. 3, alarms are separated from commands by a dotted line. The diagram in FIG. 3 contains the alarms <alarm_1> through <alarm_k>. A technology object has monitoring abilities and can set defined alarms, optionally with alarm information and predefined reactions, in the event of an error. Technology alarms are set or generated on the technology object. Technology alarms have a set technology object type-specific response, e.g., motion stop. Possible responses are specific for a technology object type and, therefore, are described explicitly for individual technology object types. Furthermore, the technology alarms have a technology object type-specific identifier (e.g., an alarm number) and parameter. Thus, they have an adjustable response to program processing (global response) and also allow error-instance-specific settings and responses which are performed on the engineering system (ES, FIG. 1) at start-up.

A user can use commands of technology objects synchronously or asynchronously, depending on settings. Therefore, a command can be written cyclically (customary with a programmable memory) or programmed in an event-controlled manner customary with synchronous controllers. In synchronous mode, a technology object, (for example executing a positioning command), remains in its state until reaching the positioning goal. In asynchronous mode, however, the technology object continues to run in its program flow simultaneously with execution of the positioning command, and it may assume other states in doing so. The technology object may then be checked, for example, by polling whether the positioning goal has been reached.

Figure 4:
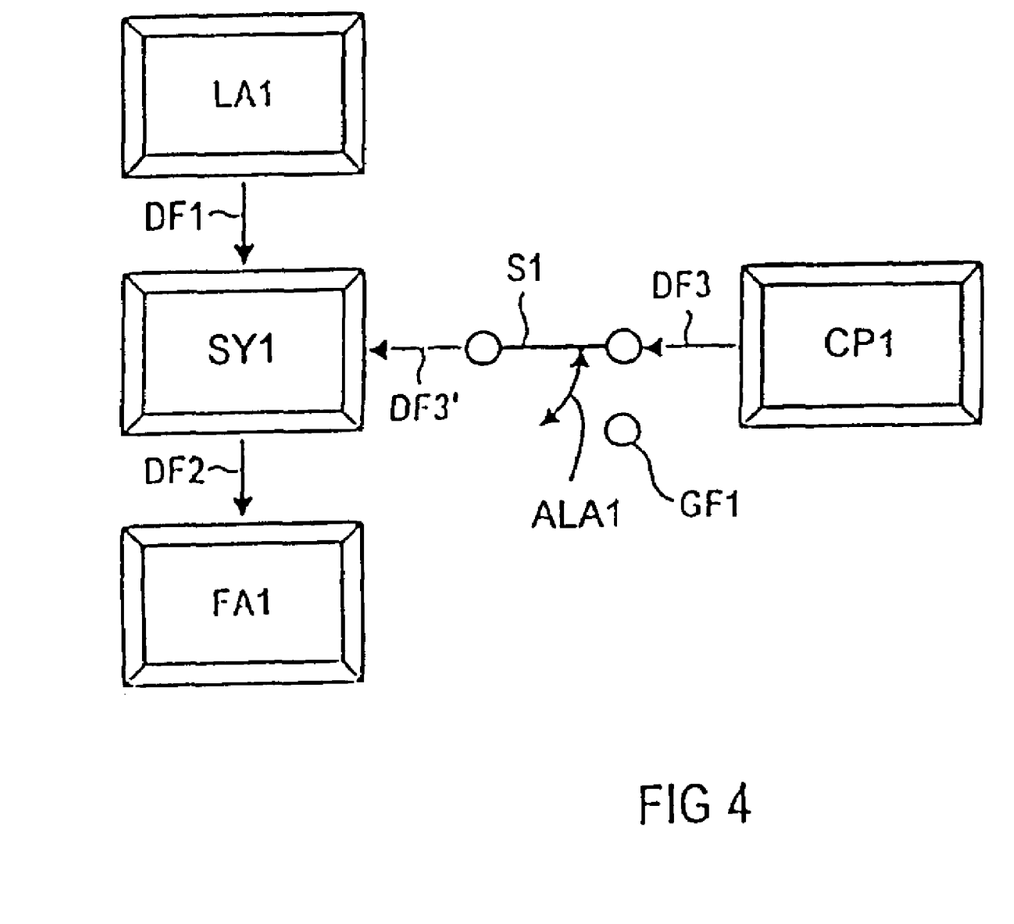
FIG. 4 shows in the form of a so-called interleaving diagram technology objects representing a synchronous interconnection.

FIG. 4 illustrates interleaving of the technology object "synchronism" SY1 with other technology objects. The technology objects are shown as double-bordered rectangles, where corners belonging together are connected by a line. A synchronous interconnection is established by interleaving the technology object "synchronism" SY1 with the technology objects "leading axis" LA1, "following axis" FA1 and "cam plate" CP1. Interleaving of the technology objects is accomplished over data flows DF1 through DF3 and DF3'.

FIG. 4 shows the basic technology arrangement for implementation of a synchronous interconnection: leading value—technology object "synchronism" SY1—technology object "following axis" FA1. In FIG. 4, the leading value is represented by the technology object "leading axis" LA1. In addition, FIG. 4 shows that the technology object "leading axis" LA1 specifies the leading value for the technology object "synchronism" SY1 over data flow arrow DF1. The technology object "leading axis" LA1 may, for example, represent a positioning axis. However, the leading value may also be specified by a virtual axis, i.e., a calculated (not real) axis, or by using external sensors for the technology object "synchronism" SY1. The technology object "synchronism" SY1 makes available gear synchronism or cam synchronism as the technological functionality, so that increasing synchronization and decreasing synchronization as well as master switching can be performed. A gear or cam may optionally be selected as the law of synchronism on the technology object "synchronism" SY1. The right part of FIG. 4 shows these selection options. Allocation arrow ALA1 shows that switch S1 may optionally be connected to a gear, represented by gear factor GF1, or to technology object "cam plate" CP1. In the case of a connection to the technology object "cam plate" CP1, the data flow is from this technology object to the technology object "synchronism" SY1 over data flow arrow DF3, switch S1 and data flow arrow DF3'. In the case of a connection to gear factor GF1, the data flow is to the technology object "synchronism" SY1 over switch S1 and data flow arrow DF3'. Linear gear transmission ratios cannot be set on the technology object "synchronism" SY1 over technology object "cam plate" CP1, but linear gear transmission ratios can be set over gear factor GF1. The technology object "synchronism" SY1 is interleaved with the technology object "following axis" FA1 by data flow arrow DF2.

FIG. 4 thus shows the basic configuration of technology objects for implementation of a synchronous functionality which may in turn be regarded and used as a (complex) technology object.

Interleaving of technology objects is specified in the configuration (design) phase. In the case of selection options, they are activated via the user program (PRG, FIG. 2) in run time, i.e., switching can be programmed in run time. In principle more than one "synchronous object" SY1 can be connected to a "following axis" FA1 by interleaving, thereby implementing superimposition of synchronous functions. The leading value for the "synchronous object" SY1 may also be specified directly from the user program (FRG, FIG. 2). Furthermore, more than one technology object may be configured to supply this leading value. The current interleaving is in turn selected and activated in run time by commands in the user program (PRG, FIG. 2). Moreover, it is possible to switch online between different technology objects "cam plate" CP1 and/or between different gear factors GF1 by programming for the definition of the law of synchronism. A technology object "cam plate" CP1 may be allocated to one or more technology objects "synchronism" SY1. In addition, one or more synchronous connections can be configured from one technology object "leading axis" LA1 via technology object "synchronism" SY1.

Figure 5:
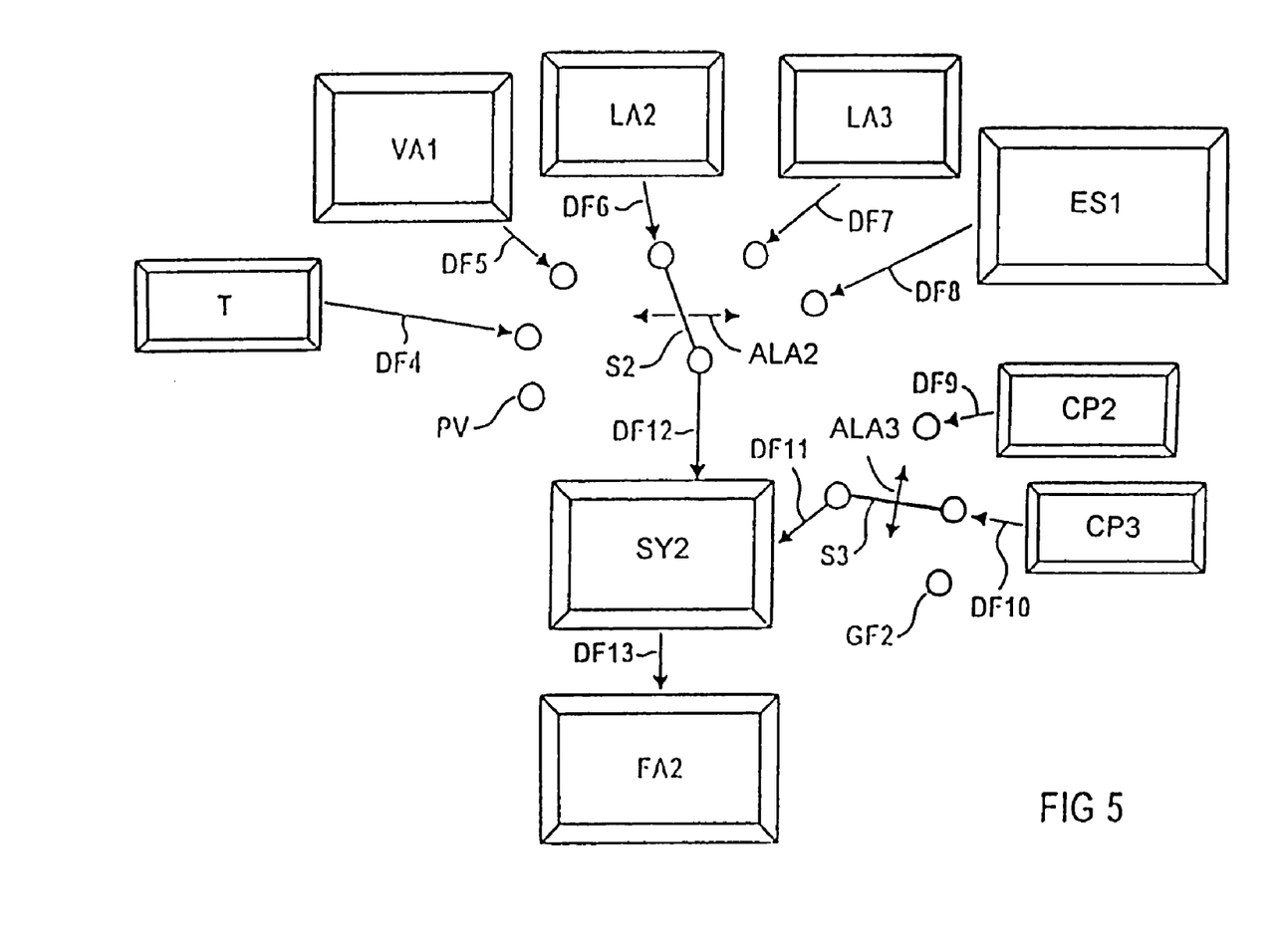
FIG. 5 shows a synchronous interconnection with switching options between different leading value sources and synchronism laws, in an interleaving diagram.

FIG. 5 shows a synchronous interconnection with switching options between different leading value sources and laws of synchronism in the form of an interleaving diagram. The technology object "synchronism" SY2 in FIG. 5 may receive leading values from the technology objects "time" T, "virtual axis" VA1, "leading axis" LA2, "leading axis" LA3, "external sensor" ES1 and from a program value PV of the user program (PRG, FIG. 2). Allocation arrow ALA2 indicates that switch S2 can establish different leading value connections for the technology object "synchronism" SY2. "Leading value interleaving" with the technology object "synchronism" SY2 is achieved over one of data flows DF4 through DF8 and over switch S2 and data flow DF12. The technology objects "time" T, "virtual axis" VA1, "leading axis" LA2 and LA3, "external sensor" ES1 and program value PV are potential masters for technology object "synchronism" SY2. Possible interleaving is designed, and a designed master can be selected in run time from the user program (PRG, FIG. 2). Master switching is hereby possible.

The technology object "virtual axis" VA1 does not represent a real axis but instead is a calculated axis. "Virtual axes" are characterized in that they can be commanded by commands and have a motion guide or interpretation, but do not have a control or a drive. The technology objects "leading axis" LA2 and LA3, on the other hand, represent real axes. Real axes represent standard axes with drive, motor, sensor, and therefore they have a real actuator. The technology object "external sensor" ES1 may also supply a leading value for the technology object "synchronism" SY2. An "external sensor" ES1 typically does not have an axis, and supplies information in a designable format. "External sensors" may be, for example, angle sensors on a press. Leading values for the technology object SY2 can also be supplied by the technology object "time" T and by the program value PV. A technology object "time" supplies a leading value in the form of a time value or time factor, and a program value PV is designed as the leading value in the user program (PRG, FIG. 2). Technology objects here are shown in the usual notation.

FIG. 5 shows that optionally a gear factor GF2 or the technology objects "cam plate" CP2 and CP3 may be selected as the law of synchronism for the technology object "synchronism" SY2. Allocation arrow ALA3 shows that switch S3 can be set optionally between technology objects CP2, CP3 and gear factor GF1. "Gear interleaving" with the technology object "synchronism" SY1 2 then takes place over data flow arrows DF9, DF10, set switch S3 and data flow arrow DF11. Switch connections S2 and S3 can be programmed in the user program (PRG, FIG. 2). The technology object "synchronism" SY2 is connected to the technology object "following axis" FA2 over data flow arrow DF13. The technology object "synchronism" SY2 is thus designed to interleave at the slave end with technology object "following axis" FA2, which may represent a synchronous axis, for example. At the master end, the technology object "synchronism" SY2 is interleaved with a technology object so that a leading value is supplied. This leading value may also be specified directly from the user program (PRG, FIG. 2). Thus, more than one technology object can be configured for supplying a leading value; the current interleaving is selected in run time over commands in the user program.

Figure 6:
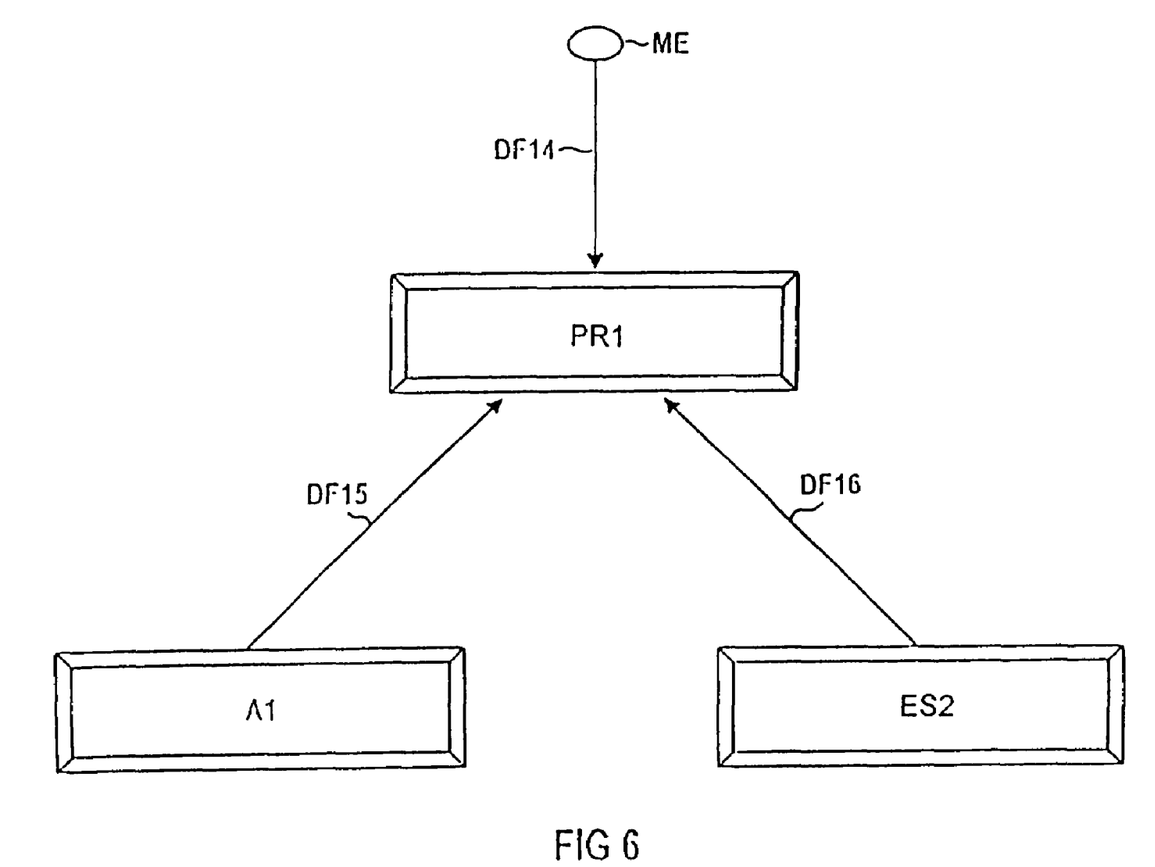
FIG. 6 shows interleaving of a probe as a technology object in an interleaving diagram.

FIG. 6 illustrates interleaving of the technology object "probe" PR1. Technology objects are shown here in the usual notation. The technology object "probe" PR1 supplies the functionality for performing a measurement task. Measurement tasks can be activated and parameterized for functions on the technology object "probe" PR1. The measured value is sent to technology object "probe" PR1 over measurement input ME and data flow arrow DF14. Measurement input ME is shown as an ellipse. One measurement input ME can be interleaved with multiple technology objects "probes." These technology objects "probes" can also be activated simultaneously. A measurement input ME usually corresponds to a hardware measurement input assigned by configuration to technology object "probe" PR1. In addition, technology object "probe" PR1 is interleaved with at least one technology object that supplies a measured value (e.g., a position). FIG. 6 shows the technology object "probe" PR1 interleaved with the technology objects "axis" A1 and "external sensor" ES2 over data flow arrows DF15 and DF16. The technology object "axis" A1 may be, for example, a positioning axis or a synchronous axis. A technology object which supplies a measured value can be interleaved with multiple technology objects "probes."

Figure 7:
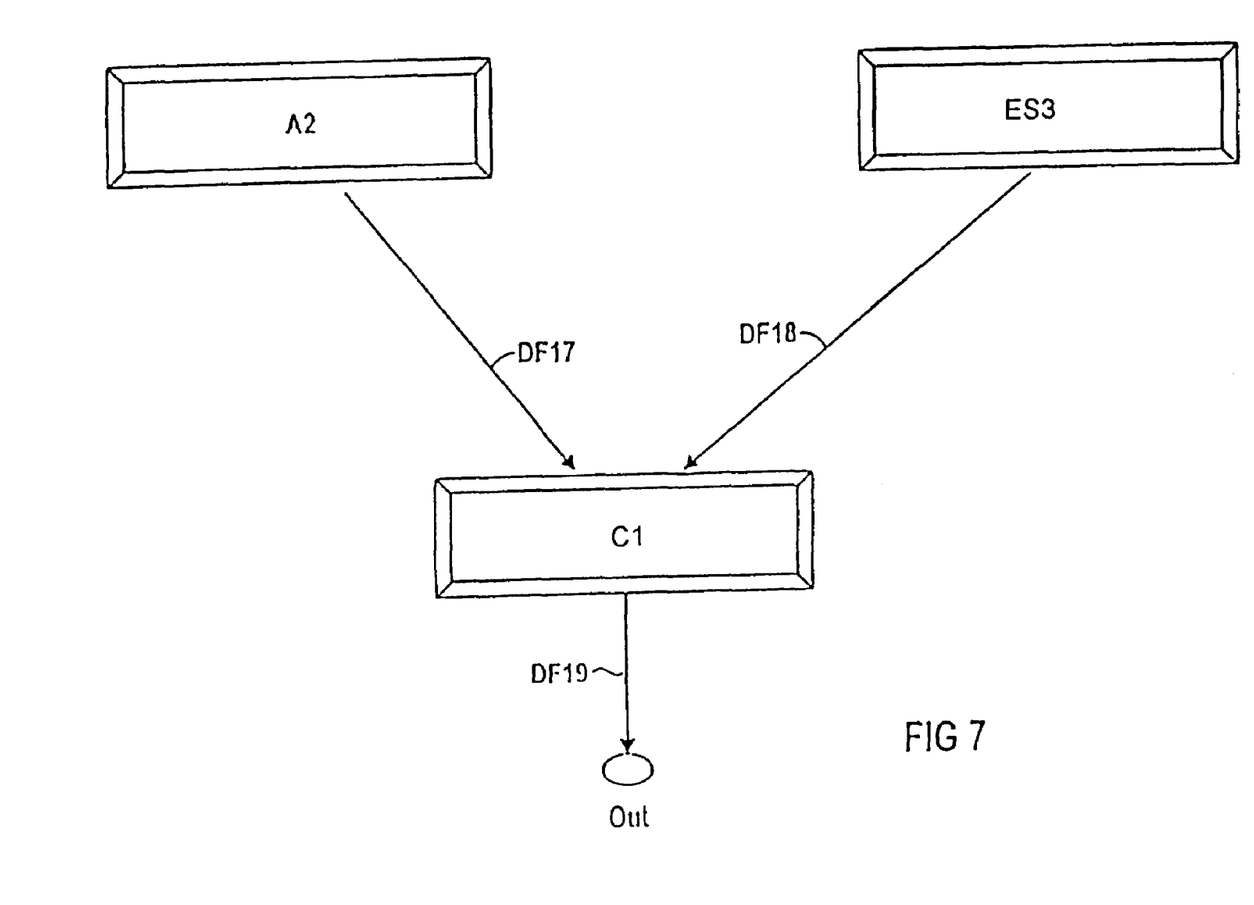
FIG. 7 shows interleaving of a cam as a technology object in an interleaving diagram.

FIG. 7 shows an interleaving diagram wherein the technology object "cam" C1 is interleaved with technology objects "axis" A2 and "external sensor" ES3. Technology object "axis" A2 is interleaved with technology object "cam" C1 over data flow arrow DF17, and technology object "external sensor" ES3 is interleaved with technology object "cam" C1 over data flow arrow DF18. Technology object "cam" C1 is interleaved with the output Out over data flow arrow DF19, and output Out is shown as an ellipse. Technology object "cam" C1 supplies the functionality for calculation of cam switching values. Cam functions can be activated and parameterized via the functions on the technology object "cam" C1. Technology objects "axis" A2 and "external sensor" ES3 supply reference values for technology object "cam" C1. The user designs the allocation of these technology objects to technology object "cam" C1. The user also designs the allocation of technology object "cam" C1 to an output Out, and allocation to internal variables is also possible. For a current application, technology object "cam" C1 is interleaved with precisely one technology object supplying the reference value.

A reference value may be an axial position, for example. Technology object "axis" A2 here may represent a positioning axis or a synchronous axis, for example. This makes it possible to omit an allocation of technology object "cam" C1 to an output Out; then the technology object "cam" C1 acts only on system variables on the technology object (e.g., for use of the technology object as an internal cam). The technology object supplying the reference value may also be interleaved with multiple, including different, technology objects cams at the same time. Technology objects are shown here in the usual notation.

Figure 8:
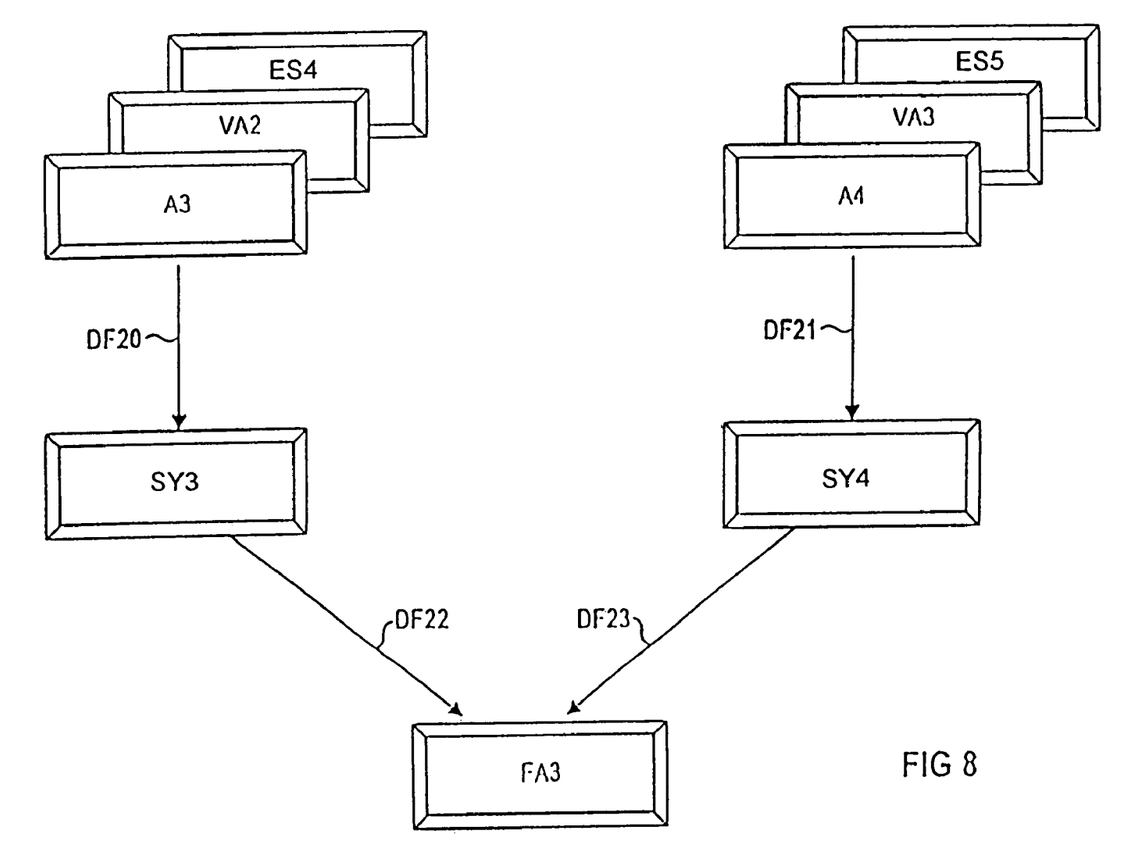
FIG. 8 shows interleaving of synchronous technology objects in an interleaving diagram.

FIG. 8 shows that a technology object "following axis" FA3 may be interleaved with multiple technology objects "synchronism" SY3 and SY4. Technology object "following axis" FA3 is interleaved with technology object "synchronism" SY3 by data flow arrow DF22 and with the technology object "synchronism" SY4 over data flow arrow DF23. Technology objects "synchronism" SY3 and SY4 receive leading value inputs over data flow arrows DF20 and DF21. FIG. 8 shows that leading values for the respective synchronous interconnection may be supplied by different technology objects. For example, technology object "axis" A3, technology object "virtual axis" VA2 or technology object "external sensor" ES4 can supply the leading value for synchronous object SY3. Accordingly, the leading value for "synchronous object" SY4 can be supplied by technology objects "axis" A4, "virtual axis" VA3 or "external sensor" ES5. Thereafter, the technology objects "axis" A4, "synchronism" SY4 and "following axis" FA3 in FIG. 8, for example, form a synchronous interconnection. The user designs the desired interleaving in each case. A designed master (the master makes available the leading value for the synchronous interconnection) can be selected in run time from the user program, so that master switching is possible. The technology object "following axis" FA3 in FIG. 8 is the slave in synchronous interconnection. Technology objects are shown here in the usual notation.

Figure 9:
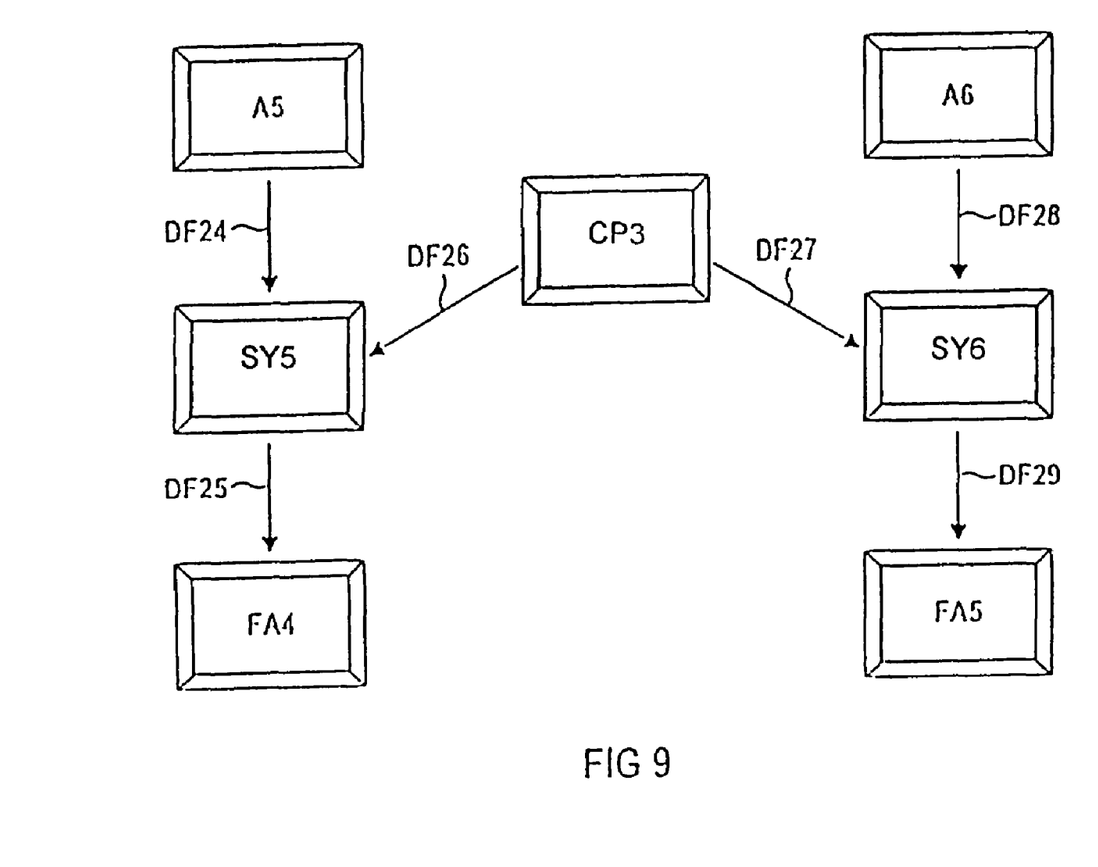
FIG. 9 shows the allocation of a cam plate as a technology object to multiple synchronous objects, likewise in an interleaving diagram.

FIG. 9 shows an interleaving diagram where the technology object "cam plate" CP3 supplies the gear law for two "synchronous objects" SY5 and SY6 over data flow arrows DF26 and DF27. FIG. 9 thus shows two synchronous interconnections, each supplied with a common gear law by the same technology object "cam plate" CP3. Two synchronous interconnections are arranged at the right and left of the technology object "cam plate" CP3. The synchronous interconnection on the left is formed by technology object "axis" A5, which supplies the leading value and thus functions as the leading axis. This axis may be a positioning axis or a synchronous axis, for example. Technology object "axis" A5 is connected to "synchronous object" SY5 by data flow arrow DF24. The leading value is supplied over this data flow arrow DF24. On the slave side, the technology object "synchronism" SY5 is connected to the technology object "following axis" FA4 by data flow arrow DF25.

The synchronous interconnection on the right is formed by the technology objects "axis" A6, "synchronism" SY6 and "following axis" FA5. "Axis" A6 here corresponds to the leading axis and "following axis" FA5 here represents a slave axis. Interleaving here takes place over data flow arrows DF28 and DF29. Furthermore, configuration of one or more synchronous connections over synchronous objects is possible from a leading axis. Technology objects "cam plates" may be allocated to one or more synchronous objects. Assembly of the synchronous interconnection is designed by the user. Designed synchronous interconnections may in turn be represented as technology objects, and their functionality may be used again in other applications. Technology objects are shown here in the usual notation.

Figure 10:
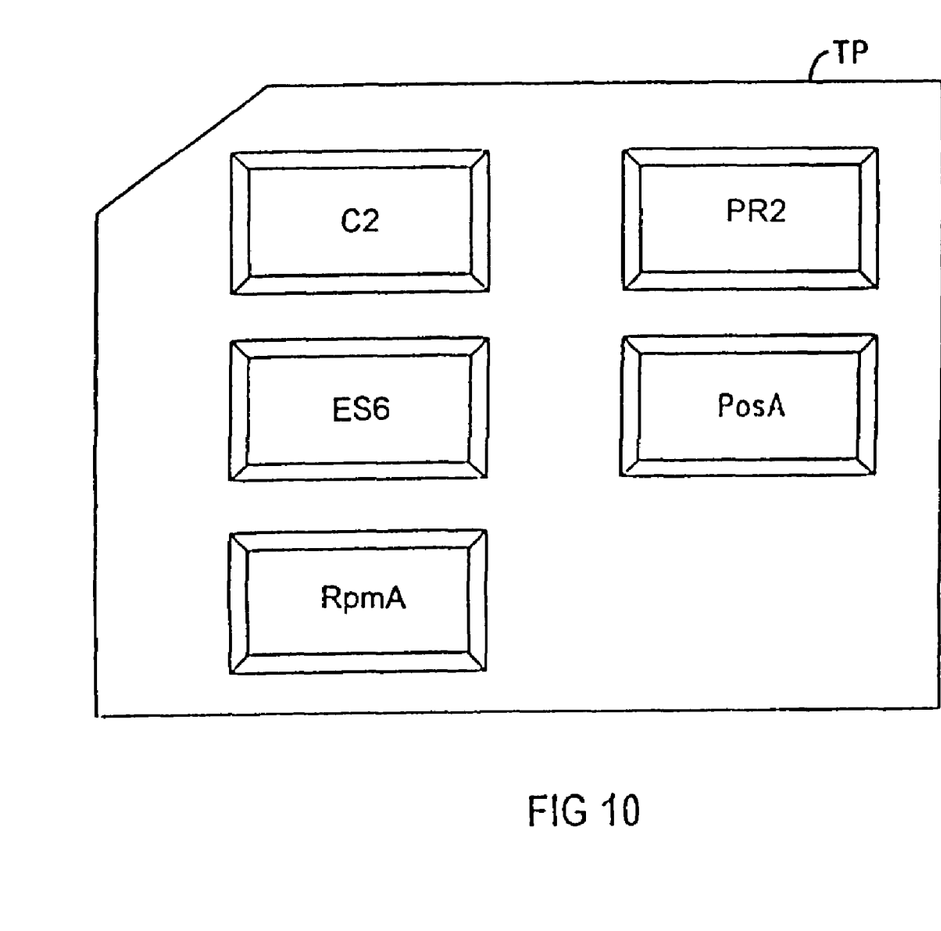
FIG. 10 shows the clustering of technology object types into a technology package in a survey diagram.

FIG. 10 illustrates the clustering of several technology objects into one technology package TP. Technology package TP is shown as a rectangle with the upper left corner clipped. The technology package TP contains technology objects "cam" C2, "external sensor" ES6, "rpm axis" RpmA, "probe" PR2 and "positioning axis" PosA. Technology objects are shown here in the usual notation. Technology objects here do not represent instances, but instead they are technology object types. A technology package TP thus contains a collection of technology object types representing certain functionalities. Loading of the technology objects into the run time system of the controller, and thus the functional expansion of the controller, takes place through technology packages. A user can load certain technology packages TP, which in turn contain technology object types, into the run time system (RTS4, RTS5 of FIG. 2) and thus can achieve technological scaling of the functionality of the controller. Furthermore, with appropriate allocation of technology object types, a functional structuring can be achieved through technology packages TP.

What is claimed is:

1. A method for programming a controller for an industrial application, the controller having an engineering system and a run time system, the method comprising the steps of:
   a) selecting a technology object type relevant to the application;
   b) instantiating and configuring the selected technology object type in the engineering system to yield a technology object;
   c) loading the technology object type and instantiated technology objects into the run time system;
   d) loading information associated with the instantiated technology object into the run time system;
   e) creating a user program using the instantiated technology object; and
   f) loading the user program into the run time system,
      wherein the technology object is programmed to be free of feedback with respect to the other technology objects and with respect to the basic system of the controller, unless feedback is explicitly programmed.

2. The method of claim 1, wherein technology objects are loaded onto hardware system of differing performance levels.

3. The method of claim 1, wherein functionality of the technology object is distributed to a control unit in equidistant communication in real time with clock synchronization.

4. The method of claim 1, wherein the technology objects comprise at least one of the group consisting of programming interfaces, system variables, and alarms.

5. The method of claim 1, wherein the technology objects are integrated into a programming environment.

6. The method of claim 1, wherein the use of technology objects is neutral as to platform and hardware.

7. The method of claim 1, wherein technology objects are hierarchically related with regard to their functionality.

8. The method of claim 1, wherein the technology object types are adapted to be clustered into technology packages.

9. The method of claim 1, wherein a control program is generated before a hardware platform for the program is allocated.

10. The method of claim 1, wherein the instances of technology object types are stored in a distributed manner on a plurality of control units.

11. A method for programming a controller for an industrial application, the controller having an engineering system and a run time system, the method comprising the steps of:
   a) selecting a technology object type relevant to the application;
   b) instantiating and configuring the selected technology object type in the engineering system to yield a technology object;
   c) loading the technology object type and instantiated technology objects into the run time system;
   d) loading information associated with the instantiated technology object into the run time system;
   e) creating a user program using the instantiated technology object; and
   f) loading the user program into the run time system,
      wherein the controller is adapted for motion control, and wherein elements comprising at least one of the group consisting of axes, sensors, cams, probes, synchronism, and cam plates are provided as technology objects.

12. The method of claim 11, wherein technology objects are loaded onto hardware system of differing performance levels.

13. The method of claim 11, wherein functionality of the technology object is distributed to a control unit in equidistant communication in real time with clock synchronization.

14. The method of claim 11, wherein the technology objects comprise at least one of the group consisting of programming interfaces, system variables, and alarms.

15. The method of claim 11, wherein the technology objects are integrated into a programming environment.

16. The method of claim 11, wherein a technology object is programmed to be free of feedback with respect to the other technology objects and with respect to the basic system of the controller, unless feedback is explicitly programmed.

17. The method of claim 11, wherein the use of technology objects is neutral as to platform and hardware.

18. The method of claim 11, wherein technology objects are hierarchically related with regard to their functionality.

19. The method of claim 11, wherein the technology object types are adapted to be clustered into technology packages.

20. The method of claim 11, wherein a control program is generated before a hardware platform for the program is allocated.

21. The method of claim 11, wherein the instances of technology object types are stored in a distributed manner on a plurality of control units.

* * * * *